Jan. 12, 1937.  F. BELL  2,067,818
LUMINOUS TUBE MOUNTING
Filed April 20, 1936
Fig.1.
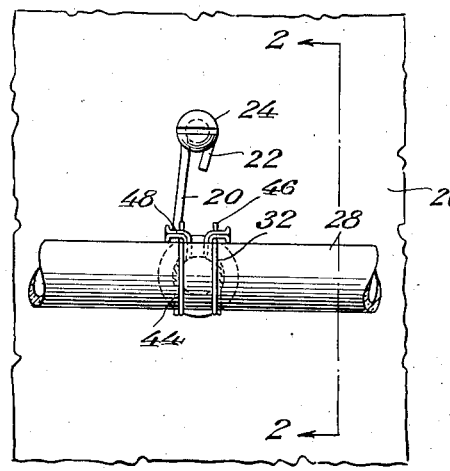
Fig.2.
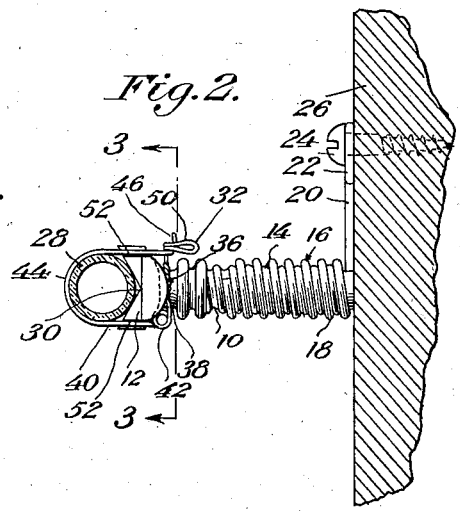
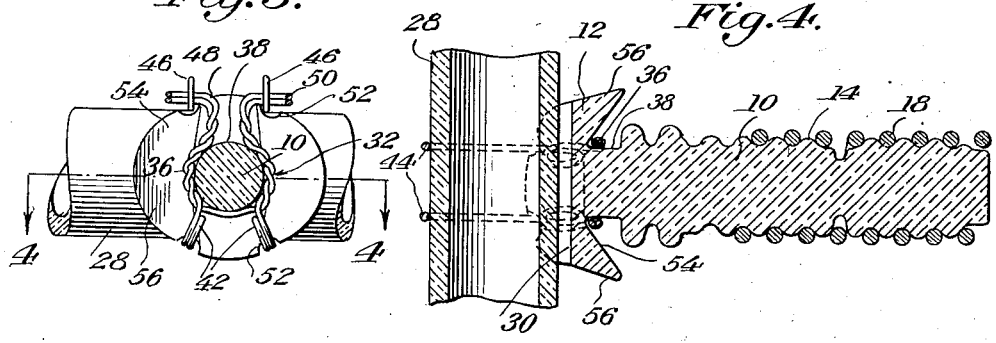
Fig.5.
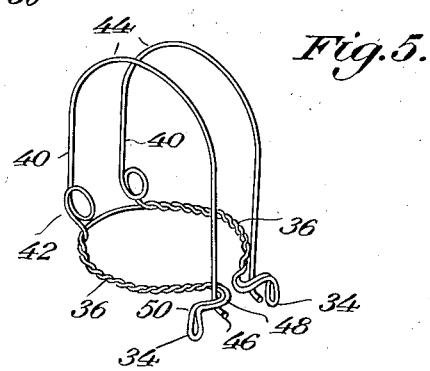
Frank Bell
INVENTOR
BY Victor J. Evans & Co.
ATTORNEYS Patented Jan. 12, 1937

2,067,818

UNITED STATES PATENT OFFICE 2,067,818

LUMINOUS TUBE MOUNTING

Frank Bell, Chicago, Ill.

Application April 20, 1936, Serial No. 75,492

1 Claim. (Cl. 248—50)

My invention relates to electric signs, and has among its objects and advantages the provision of an improved mounting for tubes containing gas such as neon.

In the accompanying drawing:

Fig. 1 is a view illustrating a portion of a tube attached to my mounting;

Fig. 2 is a sectional view along the line 2—2 of Fig. 1;

Fig. 3 is a sectional view along the line 3—3 of Fig. 2;

Fig. 4 is a sectional view along the line 4—4 of Fig. 3; and

Fig. 5 is a perspective view of the clip.

In the embodiment selected to illustrate my invention, I make use of a conventional glass stud 10 having a head 12 and provided with screw threads 14. The threaded shank is anchored in a socket 16 comprising wire bent to provide convolutions 18 having a diameter and pitch shaped to firmly anchor the stud when it is screwed into the socket 16.

The wire includes a reach 20 terminating in a loop 22 for the reception of a screw 24 anchored in the supporting structure 26. The tube 28 lies within a recess 30 in the head 12 and is securely tied to the head by means of a clip 32. The clip comprises a single piece of wire bent back upon itself at 34 and twisted at 36. The twisted reaches are curved to closely embrace the neck 38 of the stud 10. The wire is bent to provide two reaches 40, each having a convolution 42. The reaches 40 are curved at 44 to conform generally to the diameter of the tube 28 and embraces the tube for holding the same within the recess 30 in the head 12. The reaches 40 terminate in hooks 46 arranged to have connection relation with hooks 48. These hooks are provided with bends 50 which operate to effectively hold the hooks 46 and 48 in connected relation.

The head 12 is grooved at 52 for receiving the reaches 40. In operation, the tube 28 is positioned within the recess 30 and the twisted parts are slipped over the neck 38. The hooked ends of the reaches 40 are hooked into the hooks 48, which connect the tube with the head 12. The head is undercut at 54 and shaped to provide wings 56 under which the twisted reaches 36 lie. The undercuts 54 prevent disconnection of the clip from the stud.

My clip eliminates twisting of wire around the tube and the head 12 for connecting purposes. The clip is easily connected with the stud 10 and the resiliency of the wire from which the clip is made provides an advantageous holding action with respect to the tube. The tube is effectively connected with the head, but the connection, because of the resiliency of the clip, eliminates breakage of the tubes.

The convolutions 42 permit the reaches 40 to be adjusted to various positions without distorting the general configuration of the reaches. Thus, the clip may be easily mounted and detached without permanently distorting the wire. At the same time, the clip is designed for use in connection with conventional studs.

Without further elaboration, the foregoing will so fully explain my invention that others may, by applying current knowledge, readily adapt the same for use under various conditions of service.

I claim:

A mounting of the type described comprising a single piece of wire shaped to provide stud embracing means, said wire being further shaped to provide tube embracing means, and means for latching the tube embracing means with the stud embracing means.

FRANK BELL.